United States Patent [19]

Nakatsuji et al.

[11] Patent Number: 5,376,707
[45] Date of Patent: Dec. 27, 1994

[54] POLYVINYL CHLORIDE RESIN COMPOSITION FOR POWDER MOLDING AND PRODUCTION THEREOF

[75] Inventors: Yoshihiro Nakatsuji, Toyonaka; Toshio Igarashi, Kyoto; Akira Wakatsuki, Ibaraki; Yuu Shida, Takatsuki; Hikaru Shimizu, Osaka, all of Japan

[73] Assignee: Sumitomo Chemical Company, Limited, Osaka, Japan

[21] Appl. No.: 959,603

[22] Filed: Oct. 13, 1992

[30] Foreign Application Priority Data

Oct. 16, 1991 [JP] Japan .................... 3-267491
Oct. 16, 1991 [JP] Japan .................... 3-267492

[51] Int. Cl.$^5$ ............. C08J 3/215; C08K 5/04; C08L 5/00; C08F 6/14
[52] U.S. Cl. .................... 524/27; 524/56; 524/58; 525/54.3; 525/239
[58] Field of Search ............ 524/56, 58, 27; 525/239, 54.3

[56] References Cited

U.S. PATENT DOCUMENTS 3,853,970 12/1974 Dietrich .................... 524/452
4,067,928 1/1978 Walker ..................... 525/193
4,120,833 10/1978 Purvis et al. ............... 525/71
4,206,103 6/1980 Kromolicki et al. .......... 524/58
4,219,640 8/1980 Saggese et al. ............. 528/501
4,588,776 5/1986 Bekker et al. .............. 525/230

FOREIGN PATENT DOCUMENTS 61-136542 6/1982 Japan .
1-156357 6/1989 Japan .

OTHER PUBLICATIONS

"Webster's New Collegiate Dictionary", 1977, G. and C. Merriam Co. p. 501.

*Primary Examiner*—John Kight, III
*Assistant Examiner*—Jeffrey Culpeper Mullis
*Attorney, Agent, or Firm*—Wenderoth, Lind & Ponack

[57] ABSTRACT

Disclosed herein is a polyvinyl chloride resin composition for powder molding which comprises granular polyvinyl chloride resin (as component A), particulate polyvinyl chloride resin (as component B), stabilizer, plasticizer, and saccharide (as component C). Disclosed also herein is a process for producing said resin composition by mixing granular polyvinyl chloride resin (as component A), particulate polyvinyl chloride resin (as component B), stabilizer, plasticizer, and saccharide (as component C). The resin composition is suitable for the production of covering materials for automotive interior.

4 Claims, No Drawings

POLYVINYL CHLORIDE RESIN COMPOSITION FOR POWDER MOLDING AND PRODUCTION THEREOF

BACKGROUND OF THE INVENTION

1. Field of the Invention

The present invention relates to a polyvinyl chloride resin composition for powder molding and also to a process for producing the same.

2. Description of the Prior Art

The recent trend in the automotive interior covering materials for crash pad, armrest, headrest, console box, meter hood, door trim, etc. is toward those materials which are light in weight, soft to the touch, and have a high quality appearance provided by embossing which resembles a leather-like finish and a stitch-like pattern.

These covering materials are conventionally produced by the powder slush molding method which consists of contacting a powder composition with a heated mold, thereby causing particles to fuse together, and removing excess powder remaining unfused, said powder composition being formed by dry-blending polyvinyl chloride resin, plasticizer, stabilizer, pigment, etc.

The product of powder slush molding is usually backed with a polyurethane layer to be made into a covering material. The thus obtained covering material has the disadvantage of poor adhesion between the polyvinyl chloride resin layer and the polyurethane layer.

In order to overcome this disadvantage, there has been proposed an improved powder slush molding method which employs a polyvinyl chloride resin composition containing polypropylene glycol or a modified product thereof, i.e., polyether polyol (Japanese Patent Kokai No. 136542/1986).

This molding method, however, is not satisfactory because the resin composition does not adhere uniformly to the mold or the excess of the resin composition is not removed uniformly after fusing. Thus the resulting molded article greatly fluctuates in thickness and has an irregular back surface.

With the foregoing in mind, the present inventors carried out a series of experiments which led to the finding that it is possible to produce a covering material which has uniform thickness and good adhesion to the polyurethane layer if the resin composition for powder molding is incorporated with a specific compound, that is, saccharide. The present invention was completed on the basis of this finding.

SUMMARY OF THE INVENTION

It is an object of the present invention to provide a polyvinyl chloride resin composition for powder molding which comprises (A) granular polyvinyl chloride resin, (B) particulate polyvinyl chloride resin, and (C) saccharide.

It is another object of the present invention to provide a method for producing said resin composition.

It is further another object of the present invention to provide a method for producing a covering material from said resin composition.

DETAILED DESCRIPTION OF THE INVENTION

According to the present invention, the resin composition contains component A which is a granular polyvinyl chloride resin, such as homopolymers of vinyl chloride, copolymers of vinyl chloride with a copolymerizable monomer (e.g., ethylene, propylene, and vinyl acetate), and graft copolymers of ethylene-vinyl acetate copolymer with vinyl chloride. These examples are not limitative. Two or more polymers may be used in combination with one another.

The granular polyvinyl chloride resin usually has a particle diameter of 100–150 μm. It is usually produced by suspension polymerization or bulk polymerization.

According to the present invention, the resin composition contains component B which is a particulate polyvinyl chloride resin, such as homopolymers of vinyl chloride and copolymers of vinyl chloride with a copolymerizable monomer (e.g., ethylene, propylene, and vinyl acetate). Two or more polymers may be used in combination with one another. Component B is intended to coat the granules of component A.

The particulate polyvinyl chloride resin usually has a particle diameter of 0.1–10 μm. It is usually produced by emulsion polymerization or micro-suspension polymerization.

According to the present invention, the resin composition contains component C which is a saccharide represented by $C_nH_{2n}O_n$ (where n is an integer of 3–9). It includes monosaccharides (such as triose, tetrose, pentose, hexose, heptose, octose, and nonose), sugar alcohols as the reduction products of monosaccharides, oligosaccharides (such as maltose and cyclodextrin), and polysacharides (such as glycogen).

Component C should be used in an amount of 0.05–6 parts by weight to 100 parts by weight of components A and B together.

The polyvinyl chloride resin composition of the present invention may be prepared by dry-blending component A with adjuvants and component C and then incorporating the dry blend with component B, or by dry-blending component A with adjuvants and then incorporating the dry blend with a mixture of components B and C. The dry-blending is usually carried out at 60°–130° C. and the subsequent incorporation is usually carried out at 40°–80° C.

The mixture of components B and C should preferably be prepared by mixing the latex (as a polymerization product) with component C (or an aqueous solution thereof), followed by spray drying. The spray-dried product may be crushed by a microatomizer.

In the case where component C is added by dry-blending, the amount of component C should be 0.6–6 parts by weight, preferably 1–5 parts by weight, for 100 parts by weight of components A and B together. In the case where component C is added in the form of mixture with component B, the amount of component C should be 0.05–0.6 part by weight, preferably 0.1–0.5 part by weight, to 100 parts by weight of components A and B together.

According to the present invention, the resin composition may be incorporated with optional adjuvants such as blowing agent, blowing auxiliary, filler, and pigment, in addition to the plasticizer and stabilizer.

The plasticizer includes dialkyl phthalates, with the alkyl group containing 9–11 carbons (such as diisodecyl phthalate and diisoundecyl phthalate) and trialkyl trimellitates, with the alkyl group containing 7–11 carbons (such as trioctyl trimellitate, tri-2-ethylhexyl trimellitate, and tridecyl trimellitate). Any other plasticizers can be used which are ordinarily incorporated into resin compositions for powder molding. The plasticizer should usually be used in an amount of 40–120 parts by weight for 100 parts by weight of the polyvinyl chloride resin.

The stabilizer includes the compounds, particularly carboxylates, of metals such as zinc, barium, sodium, potassium, calcium, lithium, and tin. They should preferably be used in combination with one another. The stabilizer may be used in combination with any of magnesium oxide, magnesium hydroxide, hydrotalcite, zinc oxide, barium oxide, calcium oxide, barium phosphate, and the like. The stabilizer may also be used in combination with an antioxidant (derived from phenols, thioethers, phosphites, etc.), a light stabilizer (derived from diketo compounds, salicylic acid, benzophenone, benzotriazole, etc.), and an epoxy compound. They are not specifically limited so long as they are selected from those which have been used for resin compositions for powder molding. The stabilizer should usually be used in an amount of 3–15 parts by weight to 100 parts by weight of the polyvinyl chloride resin.

The blowing agent includes those of thermal decomposition type, such as azodicarbonamide, p,p'-oxybis-benzenesulfonylhydrazide, p-toluenesulfonylhydrazide, and benzenesulfonylhydrazide, of which the first one is most desirable. They may be used in combination with one another.

The blowing agent should usually be used in an amount of 1–10 parts by weight to 100 parts by weight of the polyvinyl chloride resin.

The blowing agent may be used in combination with a blowing auxiliary, if necessary. It includes zinc oxide, inorganic zinc salt (such as zinc nitrate), zinc fatty acid soap (such as zinc octoate and zinc stearate), and urea. They may be used in combination with one another. The blowing auxiliary should usually be used in an amount of 0.2–3 parts by weight to 100 parts by weight of the polyvinyl chloride resin.

The invention has been described in its general form. The polyvinyl chloride resin composition for powder molding offers the advantage of forming a uniform layer on the mold surface, permitting the smooth removal of excess powder from the mold. The resulting molded article has good adhesion to a polyurethane layer when it is made into a covering material in the subsequent process.

EXAMPLES

To further illustrate the invention, and not by way of limitation, the following examples are given.

Non-Foamable Resin Composition for Powder Molding

EXAMPLE 1

Preparation of Resin Composition

A supermixer was charged with 90 parts by weight of granular polyvinyl chloride resin (produced by suspension polymerization, having an average particle diameter of 120 $\mu$m and an average degree of polymerization of 800). After heating to 80° C. with uniform stirring, the resin was dry-blended with 70 parts by weight of trimellitic ester plasticizer, 3 parts by weight of Ba-Zn stabilizer, and 2 parts by weight of sorbitol. Mixing was continued until the temperature of the mixture reached 125° C. Then the mixture was cooled to 50° C. The mixture was uniformly incorporated with 10 parts by weight of particulate polyvinyl chloride resin (prepared by microsuspension polymerization, having an average particle diameter of 1 $\mu$m and an average degree of polymerization of 1300). Thus there was obtained a non-foamable resin composition for powder molding.

Preparation of Single-Layer Sheet

The non-foamable resin composition was sprinkled over a nickel flat mold which had just been removed from a Geer oven at 280° C. after preheating to 240° C. for 10 minutes. About 13 seconds later, excess powder (remaining unfused) was removed, and the mold was heated again in a Geer oven at 240° C. for 1 minute. After cooling, the layer of the resin composition was released from the mold. Thus there was obtained a molded sheet.

The resin composition was evaluated as follows. The results are shown in Table 1.

Methods of Evaluation (1) Removability of excess powder

Evaluated by observing the back of the molded sheet.
  The resin composition is rated as "good" if it gives rise to a molded sheet of uniform thickness and adheres to the mold uniformly.
  The resin composition is rated as "poor" if it gives rise to a molded sheet of uneven thickness and adheres to the mold unevenly.
Evaluated by filling the resin composition (level, about 75 g) into an aluminum cup (73 mm in inside diameter and 25 mm high), heating the cup on a hot plate at 240° C. for 2 minutes, upsetting the aluminum cup, and measuring the amount of the resin composition remaining in the aluminum cup.

(2) Adhesion of the single-layer sheet to semirigid polyurethane resin

Evaluated by ageing the single-layer sheet at 50° C. and 50% RH for 7 days, backing the single-layer sheet with an approximately 10 mm thick layer of semirigid polyurethane resin in a polyurethane foaming mold, cutting a 25-mm wide test piece out of the sample, and measuring the 180° peel strength between the layer of the polyvinyl chloride resin and the layer of the semi-rigid polyurethane resin.

The molding composition is rated as "good" if peeling occurs in the material (which indicates good adhesion at the interface).

The molding composition is rated as "poor" if peeling occurs at the interface (which indicates poor adhesion at the interface).

EXAMPLES 2 AND 3 AND COMPARATIVE EXAMPLES 1 AND 2

Preparation of Resin Compositions

Resin compositions were prepared in the same manner as in Example 1 except that the amount of sorbitol was changed as shown in Table 1.

Preparation of Single-Layer Sheets

Each of the resin compositions was made into a single-layer sheet in the same manner as in Example 1. The results of evaluation are shown in Table 1.

TABLE 1

| | Example No. | | | Comparative Example No. | |
|---|---|---|---|---|---|
| | 1 | 2 | 3 | 1 | 2 |
| Sorbitol (pbw) | 2 | 1 | 5 | 0 | 7 |
| Adhesion | good | good | good | poor | good |

TABLE 1-continued

| | Example No. | | | Comparative Example No. | |
|---|---|---|---|---|---|
| | 1 | 2 | 3 | 1 | 2 |
| Removability of excess powder | | | | | |
| Back of sheet | good | good | good | good | poor |
| Amount adhering to cup (g) | 25.6 (A) | 25.5 (A) | 26.1 (A) | 24.8 (B) | 27.7 (A) |
| Difference between (A) and (B), (g) | 0.8 | 0.7 | 1.3 | 0 | 2.9 |

EXAMPLE 4

The same procedure as in Example 1 was repeated except that the resin composition was prepared with 2 parts by weight of mannitol in place of sorbitol. The resulting molded sheet exhibited good adhesion to the polyurethane layer. The amount of powder adhering to the cup was 25.3 g (which is larger than that in Comparative Example 1 by 0.5 g). The back of the molded sheet showed no sign of uneven thickness.

EXAMPLE 5

The same procedure as in Example 1 was repeated except that the resin composition was prepared with 2 parts by weight of glucose in place of sorbitol. The resulting molded sheet exhibited good adhesion to the polyurethane layer. The amount of powder adhering to the cup was 25.5 g (which is larger than that in Comparative Example 1 by 0.7 g). The back of the molded sheet showed no sign of uneven thickness.

COMPARATIVE EXAMPLE 3

The same procedure as in Example 1 was repeated except that the resin composition was prepared with 2 parts by weight of polypropylene glycol in place of sorbitol. The resulting molded sheet exhibited good adhesion to the polyurethane layer. The amount of powder adhering to the cup was 31.8 g (which is larger than that in Comparative Example 1 by 6.8 g). The back of the molded sheet appeared to be of uneven thickness.

COMPARATIVE EXAMPLE 4

The same procedure as in Example 1 was repeated except that the resin composition was prepared with 2 parts by weight of polyether polyol (Sumiphen 3063 made by Sumitomo Bayer Urethane Co., Ltd.) in place of sorbitol. The resulting molded sheet exhibited good adhesion to the polyurethane layer. The amount of powder adhering to the cup was 35.7 g (which is larger than that in Comparative Example 1 by 10.7 g). The back of the molded sheet appeared to be of uneven thickness.

EXAMPLE 6

Preparation of Saccharide-Containing Particulate Polyvinyl Chloride Resin)

A 100-liter autoclave with glass lining was charged with 40 kg of deionized water and 920 g of polyvinyl chloride in the form of latex having an average particle diameter of 0.3 μm. The atmosphere in the autoclave was replaced with nitrogen under reduced pressure. The autoclave was further charged with 34 kg of vinyl chloride monomer. The autoclave was heated to start polymerization. Throughout the period of polymerization, hydrogen peroxide in a total amount of 0.004 wt % (of the amount of vinyl chloride monomer) and Rongalite in a total amount of 1.0 equivalent mol (with respect to hydrogen peroxide) were introduced into the autoclave at a constant rate through separate inlets. After the rate of polymerization had reached 12%, sodium lauryl sulfate (as an emulsifier) was continuously added to the autoclave at a ratio of 0.03% (of the amount of vinyl chloride monomer) every hour until polymerization was complete. Polymerization was suspended when the polymerization pressure decreased by 1 kg/cm$^2$ from the saturated vapor pressure of vinyl chloride at the polymerization temperature, and unreacted monomer was recovered. The amount of sodium lauryl sulfate added was 0.3 wt % of the amount of polymer produced, and the average particle diameter of the polymer was 1.0 μm.

The thus obtained latex (containing 3 kg of polyvinyl chloride resin) was incorporated with an aqueous solution prepared by dissolving 150 g of sorbitol in hot water at 80° C. Then the latex was adjusted to pH 7 with sodium carbonate.

Finally, the latex was spray-dried at a rate of 37 g/min using a rotational disc atomizer (12 cm in diameter), with the inlet temperature and outlet temperature kept at 160° C. and 60° C., respectively. The dried product was crushed using a microatomizer. Thus there was obtained a white powder.

(The above-mentioned procedure was used in the following example for the production of saccharide-containing particulate vinyl chloride resin.)

Preparation of Resin Composition

A supermixer was charged with 90 parts by weight of granular polyvinyl chloride resin (produced by suspension polymerization, having an average particle diameter of 120 μm and an average degree of polymerization of 800). After heating to 80° C. with uniform stirring, the resin was dry-blended with 70 parts by weight of trimellitic ester plasticizer and 3 parts by weight of Ba—Zn stabilizer. Mixing was continued until the temperature of the mixture reached 125° C. Then the mixture was cooled to 50° C. The mixture was uniformly incorporated with 10 parts by weight of the particulate polyvinyl chloride resin (prepared as mentioned above). Thus there was obtained a non-foamable resin composition for powder molding.

Preparation of Single-Layer Sheet

The non-foamable resin composition was sprinkled over a nickel flat mold which had just been removed from a Geer oven at 280° C. after preheating to 240° C. for 10 minutes. About 13 seconds later, excess powder (remaining unfused) was removed, and the mold was heated again in a Geer oven at 240° C. for 1 minute. After cooling, the layer of the resin composition was released from the mold. Thus there was obtained a molded sheet. The results of evaluation are shown in Table 2.

EXAMPLES 7 AND 8 AND COMPARATIVE EXAMPLES 5 AND 6

Preparation of Resin Compositions

Resin compositions were prepared in the same manner as in Example 6 except that the amount of sorbitol was changed to 30, 120, 0, and 300 g, respectively.

Preparation of Single-Layer Sheets

Each of the resin compositions was made into a single-layer sheet in the same manner as in Example 6. The results of evaluation are shown in Table 2.

TABLE 2

|  | Example No. | | | Comparative Example No. | |
| --- | --- | --- | --- | --- | --- |
|  | 6 | 7 | 8 | 5 | 6 |
| Sorbitol (pbw) | 0.5 | 0.1 | 0.4 | 0 | 1.0 |
| Adhesion | good | good | good | poor | good |
| Removability of excess powder |  |  |  |  |  |
| Back of sheet | good | good | good | good | poor |
| Amount adhering to cup (g) | 26.3 (A) | 25.9 (A) | 26.5 (A) | 25.0 (B) | 28.1 (A) |
| Difference between (A) and (B), (g) | 1.3 | 0.9 | 1.5 | 0 | 3.1 |

EXAMPLE 9

The same procedure as in Example 6 was repeated except that the resin composition was prepared with 60 g by weight of mannitol in place of sorbitol. The resulting molded sheet exhibited good adhesion to the polyurethane layer. The amount of powder adhering to the cup was 25.6 g (which is larger than that in Comparative Example 5 by 0.6 g). The back of the molded sheet showed no signs of uneven thickness.

EXAMPLE 10

The same procedure as in Example 6 was repeated except that the resin composition was prepared with 60 g by weight of glucose in place of sorbitol. The resulting molded sheet exhibited good adhesion to the polyurethane layer. The amount of powder adhering to the cup was 26.0 g (which is larger than that in Comparative Example 5 by 1.0 g). The back of the molded sheet showed no signs of uneven thickness.

Foamable Resin Composition for Powder Molding

EXAMPLE 11

Preparation of Foamable Resin Composition

A supermixer was charged with 90 parts by weight of granular polyvinyl chloride resin (produced by suspension polymerization, having an average particle diameter of 120 μm and an average degree of polymerization of 800). After heating to 80° C. with uniform stirring, the resin was dry-blended with 70 parts by weight of trimellitic ester plasticizer, 3 parts by weight of Ba—Zn stabilizer, 1.5 parts by weight of azodicarbonamide, 1 part by weight of zinc oxide, and 2 parts by weight of sorbitol. Mixing was continued until the temperature of the mixture reached 125° C. Then the mixture was cooled to 50° C. The mixture was uniformly incorporated with 10 parts by weight of particulate polyvinyl chloride resin (prepared by microsuspension polymerization, having an average particle diameter of 1 μm and an average degree of polymerization of 1300). Thus there was obtained a foamable resin composition for powder molding.

Preparation of Double-Layer Sheet from the Non-Foamable Resin Composition and the Foamable Resin Composition The sorbitol-free non-foamable resin composition (prepared in Comparative Example 1) was sprinkled over a nickel flat mold which had just been removed from a Geer oven at 280° C. after preheating to 240° C. for 10 minutes. About 5 seconds later, excess powder (remaining unfused) was removed. The foamable resin composition was sprinkled over the mold. About 15 seconds later, excess powder (remaining unfused) was removed, and the mold was heated again in a Geer oven at 240° C. for 1 minute so as to effect foaming. After cooling, the double-layer of the resin composition was released from the mold. The results of evaluation of the double-layer sheet are shown in Table 3.

Method of Evaluation (1) Adhesion of the double-layer sheet to semirigid polyurethane resin Evaluated by ageing the double-layer sheet at 25° C. and 50% RH for 1 day, backing the double-layer sheet with an approximately 10 mm thick layer of semirigid polyurethane resin in a polyurethane foaming mold, cutting a 25-mm wide test piece out of the sample, and measuring the 180° peel strength between the layer of the polyvinyl chloride resin and the layer of the semi-rigid polyurethane resin. (The 180° peel strength was measured at 23° C. and at a pulling rate of 200 mm/min.)

Evaluations of other items were carried out in the same manner as in Example 1.

EXAMPLES 12 AND 13 AND COMPARATIVE EXAMPLES 7 AND 8

Preparation of Foamable Resin Compositions

Foamable resin compositions were prepared in the same manner as in Example 11 except that the amount of sorbitol was changed as shown in Table 3.

Preparation of Double-Layer Sheets

Each of the foamable resin compositions was made into a double-layer sheet in the same manner as in Example 11. The results of evaluation are shown in Table 3.

TABLE 3

|  | Example No. | | | Comparative Example No. | |
| --- | --- | --- | --- | --- | --- |
|  | 11 | 12 | 13 | 7 | 8 |
| Sorbitol (pbw) | 2 | 1 | 5 | 0 | 7 |
| Peel strength, kg/25 mm | 0.55 | 0.45 | 0.65 | 0.20 | 0.70 |
| Removability of excess powder |  |  |  |  |  |
| Back of sheet | good | good | good | good | poor |
| Amount adhering to cup (g) | 26.1 (A) | 25.7 (A) | 26.5 (A) | 25.0 (B) | 28.0 (A) |
| Difference between (A) and (B), (g) | 1.1 | 0.7 | 1.5 | 0 | 3.0 |

EXAMPLE 14

The same procedure as in Example 11 was repeated except that the foamable resin composition was prepared with 2 parts by weight of mannitol in place of sorbitol. The peel strength between the double-layer sheet and the polyurethane layer was 0.55 kg/25 mm. The amount of powder adhering to the cup was 25.6 g (which is larger than that in Comparative Example 7 by 0.6 g). The back of the molded sheet showed no signs of uneven thickness.

EXAMPLE 15

The same procedure as in Example 11 was repeated except that the foamable resin composition was prepared with 2 parts by weight of glucose in place of sorbitol. The peel strength between the double-layer sheet and the polyurethane layer was 0.50 kg/25 mm. The amount of powder adhering to the cup was 26.0 g (which is larger than that in Comparative Example 7 by 1.0 g). The back of the molded sheet showed no signs of uneven thickness.

COMPARATIVE EXAMPLE 9

The same procedure as in Example 11 was repeated except that the foamable resin composition was prepared with 2 parts by weight of propylene glycol in place of sorbitol. The peel strength between the double-layer sheet and the polyurethane layer was 0.40 kg/25 mm. The amount of powder adhering to the cup was 32.1 g (which is larger than that in Comparative Example 7 by 7.1 g). The back of the molded sheet appeared to be of uneven thickness.

COMPARATIVE EXAMPLE 10

The same procedure as in Example 11 was repeated except that the foamable resin composition was prepared with 2 parts by weight of polyether polyol in place of sorbitol. The peel strength between the double-layer sheet and the polyurethane layer was 0.30 kg/25 mm. The amount of powder adhering to the cup was 35.8 g (which is larger than that in Comparative Example 7 by 10.8 g). The back of the molded sheet appeared to be of uneven thickness.

EXAMPLE 16

Preparation of Foamable Resin Composition

A supermixer was charged with 90 parts by weight of granular polyvinyl chloride resin (produced by suspension polymerization, having an average particle diameter of 120 μm and an average degree of polymerization of 800). After heating to 80° C. with uniform stirring, the resin was dry-blended with 70 parts by weight of trimellitic ester plasticizer, 3 parts by weight of Ba-Zn stabilizer, 1.5 parts by weight of azodicarbonamide, and 1.5 parts by weight of zinc oxide. Mixing was continued until the temperature of the mixture reached 125° C. Then the mixture was cooled to 50° C. The mixture was uniformly incorporated with 10 parts by weight of particulate polyvinyl chloride resin (prepared by microsuspension polymerization, having an average particle diameter of 1 μm and an average degree of polymerization of 1300) which contains 2 parts by weight of sorbitol to 100 parts by weight of the particulate polyvinyl chloride resin. Thus there was obtained a foamable resin composition for powder molding.

Preparation of Double-Layer Sheet from the Non-Foamable Resin Composition and the Foamable Resin Composition The sorbitol-free non-foamable resin composition (prepared in Comparative Example 1) was sprinkled over a nickel flat mold which had just been removed from a Geer oven at 280° C. after preheating to 240° C. for 10 minutes. About 5 seconds later, excess powder (remaining unfused) was removed. The foamable resin composition was sprinkled over the mold. About 15 seconds later, excess powder (remaining unfused) was removed, and the mold was heated again in a Geer oven at 240° C. for 1 minute so as to effect foaming. After cooling, the double-layer of the resin composition was released from the mold. The results of evaluation of the double-layer sheet are shown in Table 4.

EXAMPLES 17 AND 18 AND COMPARATIVE EXAMPLES 11 and 12

Preparation of Foamable Resin Compositions

Foamable resin compositions were prepared in the same manner as in Example 16 except that the particulate polyvinyl chloride resin was replaced by the one which contains sorbitol in an amount of 1, 4, 0, and 10 parts by weight, respectively, to 100 parts by weight of the particulate polyvinyl chloride resin.

Preparation of Double-Layer Sheets

Each of the foamable resin compositions was made into a double-layer sheet in the same manner as in Example 16. The results of evaluation are shown in Table 4.

TABLE 4

|  | Example No. | | | Comparative Example No. | |
|---|---|---|---|---|---|
|  | 16 | 17 | 18 | 11 | 12 |
| Sorbitol (pbw) | 0.2 | 0.1 | 0.4 | 0 | 1.0 |
| Peel strength, kg/25 mm | 0.65 | 0.55 | 0.75 | 0.20 | 0.90 |
| Removability of excess powder |  |  |  |  |  |
| Back of sheet | good | good | good | good | poor |
| Amount adhering to cup (g) | 26.5 (A) | 26.1 (A) | 26.1 (A) | 25.0 (B) | 28.1 (A) |
| Difference between (A) and (B), (g) | 1.5 | 1.1 | 1.3 | 0 | 3.1 |

EXAMPLE 19

The same procedure as in Example 16 was repeated except that the particulate polyvinyl chloride resin was replaced by the one which contains 2 parts by weight of mannitol to 100 parts by weight of particulate polyvinyl chloride resin. The peel strength between the double-layer sheet and the polyurethane layer was 0.65 kg/25 mm. The amount of powder adhering to the cup was 26.2 g (which is larger than that in Comparative Example 11 by 1.2 g). The back of the molded sheet showed no signs of uneven thickness.

EXAMPLE 20

The same procedure as in Example 16 was repeated except that the particulate polyvinyl chloride resin was replaced by the one which contains 2 parts by weight of glucose to 100 parts by weight of particulate polyvinyl chloride resin. The peel strength between the double-layer sheet and the polyurethane layer was 0.60 kg/25 mm. The amount of powder adhering to the cup was 25.5 g (which is larger than that in Comparative Example 11 by 1.5 g). The back of the molded sheet showed no signs of uneven thickness.

What is claimed is:

1. A polyvinyl chloride resin composition for powder molding, said composition being produced by the process which comprises
    (1) dry-blending
        A. granular polyvinyl chloride resin having an average particle diameter of from 100 to 150 μm,
        D. stabilizer,
        E. plasticizer, and, optionally,
        F. blowing agent,
    (2) separately blending B. particulate polyvinyl chloride resin latex having an average particle diameter of from 0.1 to 10 μm, and C. an aqueous solution of saccharide in the amount of 0.05–0.6 parts by weight per 100 parts by weight of components A and B combined and drying the resultant blend, and (3) incorporating the resultant blend of B and C into the resultant blend of step (1).

2. A resin composition as defined in claim 1, wherein the weight ratio of component B to component A is from 3/97 to 20/80.

3. A process for producing a polyvinyl chloride resin composition for powder-molding which comprises (1) dry-blending A. granular polyvinyl chloride resin having an average particle diameter of from 100 to 150 μm, D. stabilizer, E. plasticizer, and, optionally, F. blowing agent, (2) separately blending B. particulate polyvinyl chloride resin latex having an average particle diameter of from 0.1 to 10 μm, and C. an aqueous solution of saccharide in the amount of 0.05–0.6 parts by weight per 100 parts by weight of components A and B combined and drying the resultant blend, and (3) incorporating the resultant blend of B and C into the resultant blend of step (1).

4. A process according to claim 3 wherein the weight ratio of component B to component A is from 3/97 to 20/80.

* * * * *